US008824137B2

(12) United States Patent
Nakayama

(10) Patent No.: US 8,824,137 B2
(45) Date of Patent: Sep. 2, 2014

(54) ELECTRONIC DEVICE HOUSING DEVICE

(75) Inventor: Takaya Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 13/451,658

(22) Filed: Apr. 20, 2012

(65) Prior Publication Data

US 2012/0327598 A1 Dec. 27, 2012

(30) Foreign Application Priority Data

Jun. 24, 2011 (JP) ................................. 2011-141243

(51) Int. Cl.
*G06F 1/20* (2006.01)
*H05K 7/20* (2006.01)
*G11B 33/14* (2006.01)
*G11B 33/12* (2006.01)

(52) U.S. Cl.
CPC ............ *G11B 33/128* (2013.01); *G11B 33/142* (2013.01)
USPC .............. 361/679.5; 361/679.48; 361/679.49; 361/694; 361/695; 361/716; 312/223.2; 312/236; 454/184

(58) Field of Classification Search
USPC ........................ 361/679.48–679.51, 690, 692, 361/694–695, 716; 312/223.2, 236; 454/184
See application file for complete search history.

(56) References Cited

U.S. PATENT DOCUMENTS

| | | | | |
|---|---|---|---|---|
| 2,843,806 A | * | 7/1958 | O'Neill ......................... | 361/678 |
| 4,399,484 A | * | 8/1983 | Mayer ........................... | 361/689 |
| 4,821,146 A | * | 4/1989 | Behrens et al. ............... | 361/692 |
| 5,663,868 A | * | 9/1997 | Stalley .......................... | 361/695 |
| 5,912,801 A | * | 6/1999 | Roy et al. ...................... | 361/690 |
| 6,900,387 B2 | * | 5/2005 | Gravell et al. .................. | 174/50 |
| 6,906,918 B2 | * | 6/2005 | Rabinovitz ............... | 361/679.48 |
| 7,031,154 B2 | * | 4/2006 | Bash et al. ..................... | 361/690 |
| 7,075,788 B2 | * | 7/2006 | Larson et al. ................. | 361/695 |
| 7,079,387 B2 | * | 7/2006 | Brooks et al. ............. | 361/679.51 |
| 7,227,751 B2 | * | 6/2007 | Robbins et al. ............... | 361/695 |
| 7,755,889 B2 | * | 7/2010 | Vinson et al. ............ | 361/679.49 |
| 7,843,683 B2 | * | 11/2010 | Suffern et al. ........... | 361/679.46 |
| 8,089,763 B2 | * | 1/2012 | Lin ............................... | 361/695 |
| 8,208,253 B1 | * | 6/2012 | Goergen et al. ............ | 361/679.5 |
| 8,475,246 B2 | * | 7/2013 | Mayer et al. .................. | 454/184 |
| 2005/0168942 A1 | * | 8/2005 | Steinbrecher ................ | 361/690 |
| 2007/0147010 A1 | * | 6/2007 | Arnel et al. ................... | 361/727 |
| 2009/0249803 A1 | | 10/2009 | Suzuki et al. | |

FOREIGN PATENT DOCUMENTS

| | | |
|---|---|---|
| JP | 11-204974 | 7/1999 |
| JP | 2008-153278 | 7/2008 |
| JP | 2009-170649 | 7/2009 |

* cited by examiner

*Primary Examiner* — Robert J Hoffberg
(74) *Attorney, Agent, or Firm* — Staas & Halsey LLP

(57) ABSTRACT

An electronic device housing device includes a housing, a plurality of slots that are arranged side by side inside the housing, the slots each housing the electronic device, a gas passage that guides a gas flowing into each of the slots in a direction across the slots, a connection substrate provided inside the housing to extend upright, the connection substrate being arranged to face the slots, the connection substrate including a connected portion to which a connecting portion of the electronic device housed in each of the slots is to be connected, a ventilation port provided at an end portion of the connection substrate, the ventilation port allowing the gas to flow into through the gas passage from each of the slots, and a fan that sucks the gas flowing into each of the slots into the ventilation port through the gas passage.

8 Claims, 10 Drawing Sheets

ELECTRONIC DEVICE HOUSING DEVICE

CROSS-REFERENCE TO RELATED APPLICATION

This application is based upon and claims the benefit of priority of the prior Japanese Patent Application No. 2011-141243, filed on Jun. 24, 2011, the entire contents of which are incorporated herein by reference.

FIELD

The embodiment discussed herein is related to an electronic device housing device.

BACKGROUND

An electronic device housing device that can house a plurality of electronic devices, such as a hard disk drive (HDD), a power source device, and a circuit substrate, inside a housing is known in the art. Examples of the electronic device housing device include a storage device equipped with a plurality of HDDs, a control device that controls the HDDs, and a power source device.

In recent years, there has been an increasing demand for thin storage devices that can house several HDDs arranged side by side in a row on one to three shelves. The thin storage devices are mainly used as placed on a rack. Such storage devices are called "rack-mounted storage devices".

A plurality of slots partitioned by a plurality of partition plates are provided in the housing of the storage device to allow a cartridge HDD carried on a carrier with a grip to be housed in each of the slots.

An HDD is a storage device that magnetically stores data utilizing a rotatable magnetic disk medium and a magnetic head. Mechanical parts such as the magnetic disk medium and the magnetic head are housed in a sealed case.

A connection substrate formed by a single plate and equipped with a plurality of connection terminals is disposed near the center of the housing of the storage device. The plurality of connection terminals are disposed in parallel on the connection substrate to face the slots, and electrically connected to external connection terminals and power source terminals of the HDDs.

The connection substrate is provided near the center portion of the housing as discussed earlier, and therefore divides the housing space inside the housing into a front housing portion and a rear housing portion. The plurality of slots are disposed in the front housing portion, and the control device and the power source device electrically connected to the connection substrate are disposed in the rear housing portion. Each of the HDDs sends and receives a signal to and from the control device, and is supplied with power from the power source device, via the connection substrate.

A cooling fan is provided in the rear housing portion of the housing. The cooling fan is driven to allow a gas to be sucked into the slots from gas suction ports provided in a front panel of the housing and the carriers.

The sucked gas flows straight into the rear housing portion while cooling the HDDs in the slots, cools the control device and the power source device, and thereafter is discharged from an exhaust port provided in the rear wall surface of the housing. The HDDs, the control device, and the power source device are cooled by such an air-cooling structure. However, the plate-shaped connection substrate provided near the center portion obstructs the gas flow linearly guided from the gas suction ports to the rear housing portion across the connection substrate.

Examples of the related art described above are disclosed in Japanese Laid-open Patent Publication No. 2009-170649 and Japanese Laid-open Patent Publication No. 11-204974.

In recent years, it has been further desired to reduce the thickness of a storage device. Reducing the thickness, however, makes it difficult to secure a passage of a gas for cooling electronic devices.

SUMMARY

According to an aspect of the invention, an electronic device housing device includes a housing, a plurality of slots that are arranged side by side inside the housing, the slots each housing the electronic device, a gas passage that guides a gas flowing into each of the slots in a direction across the slots, a connection substrate provided inside the housing to extend upright, the connection substrate being arranged to face the slots, the connection substrate including a connected portion to which a connecting portion of the electronic device housed in each of the slots is to be connected, a ventilation port provided at an end portion of the connection substrate, the ventilation port allowing the gas to flow into through the gas passage from each of the slots, and a fan that sucks the gas flowing into each of the slots into the ventilation port through the gas passage.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Figure 1A:
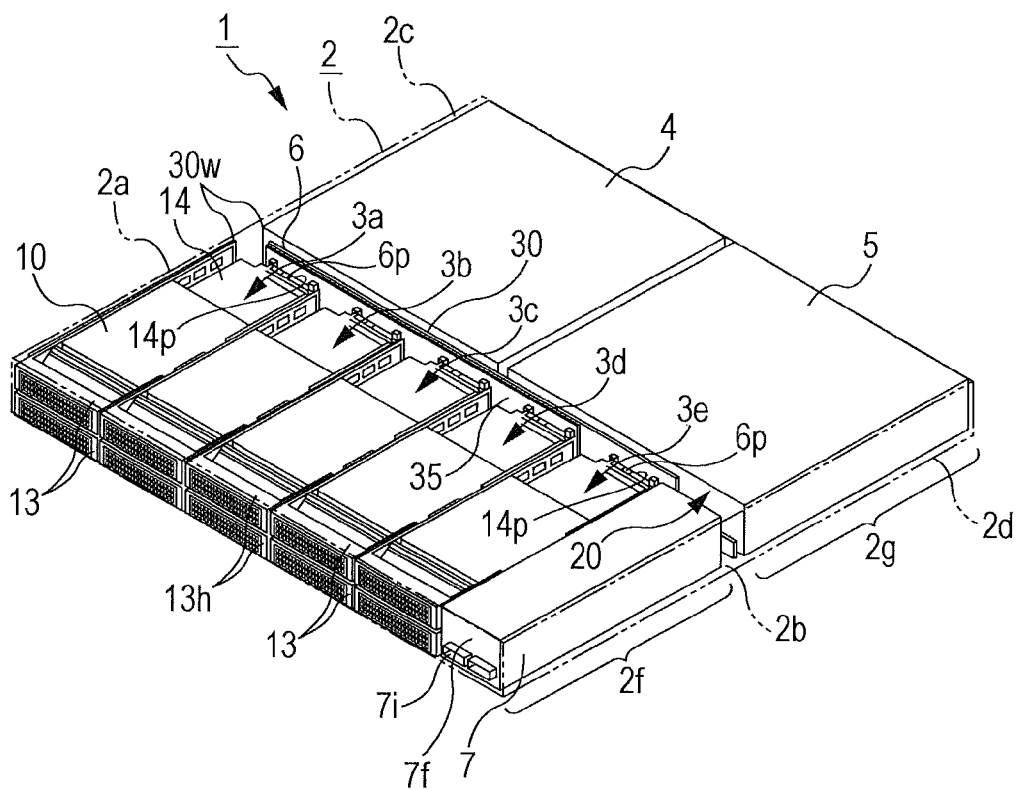
FIGS. 1A and 1B are each a perspective view illustrating the internal structure of an electronic device housing device.
Figure 1B:
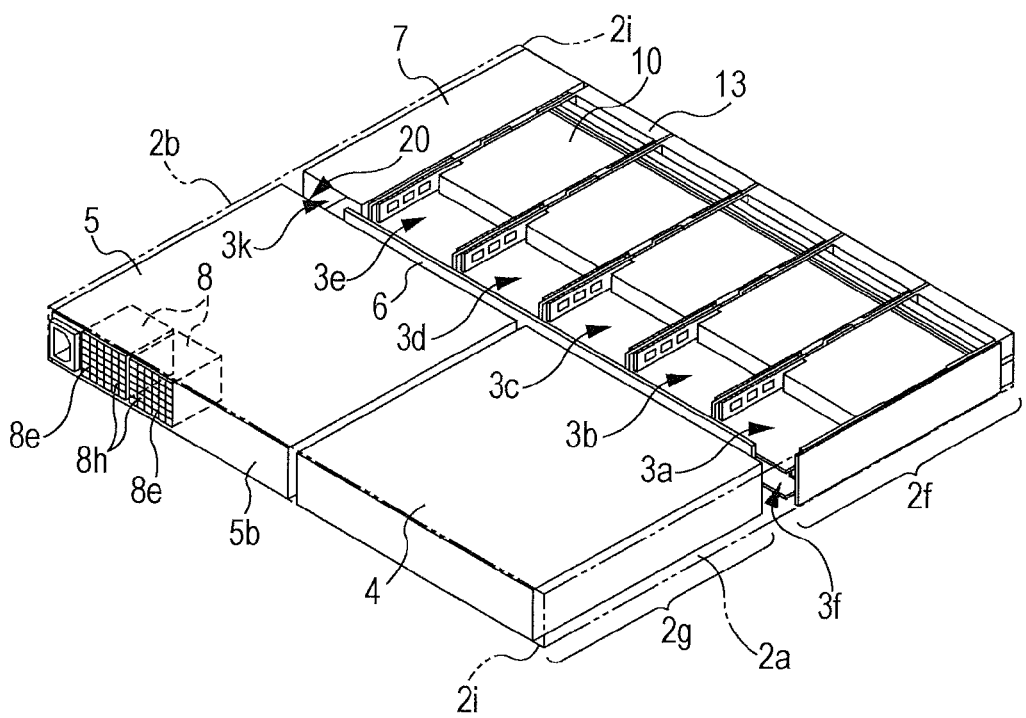

An embodiment will be described in detail below with reference to the drawings. FIGS. 1A and 1B are each a perspective view illustrating the internal structure of an electronic device housing device 1. FIG. 1A is a perspective view as seen from the front side, and FIG. 1B is a perspective view as seen from the rear side.

The electronic device housing device 1 according to the embodiment includes a rectangular parallelepiped housing 2. In FIGS. 1A and 1B, the internal structure of the electronic device housing device 1 is illustrated with the housing 2 transparent. In the embodiment, the electronic device housing device 1 (storage device) that can carry a plurality of HDDs 10 as electronic devices is described as an example.

The housing 2 is provided with a housing space surrounded by left and right lateral wall surfaces 2a and 2b, upper and lower wall surfaces 2c and 2d, and front and rear openings 2i. The housing space is divided into a front housing portion 2f and a rear housing portion 2g by a connection substrate 6 provided near the center portion of the housing 2.

As illustrated in FIGS. 1A and 1B, a plurality of slots 3a to 3j is provided in the front housing portion 2f. The number of the slots is the same of the number of the HDDs 10 that can be carried. In the embodiment, five HDDs for each of the upper and lower rows, that is, ten HDDs can be carried. However, the embodiment is not limited to such a number of HDDs. The structure of each of the slots 3a to 3j will be discussed later.

As illustrated in FIGS. 1A and 1B, a control device 4 and a power source device 5 are disposed in the rear housing portion 2g. The control device 4 receives a command from a host device, and gives the HDDs 10 various commands such as for reading and writing of data to control the HDDs 10. The power source device 5 supplies power to the control device 4, the HDDs 10, and cooling fans 8 provided in the power source device 5.

The connection substrate 6 is a substrate formed by a single plate and provided near the center portion of the housing 2 to extend in the direction of arrangement of the slots. A plurality of connection substrates 6 may be provided for the respective slots. However, providing a single connection substrate 6 for all the slots reduces the assembly cost of the connection substrate 6, and reduces the size of the connection substrate 6.

One surface of the connection substrate 6 is provided with connection terminals 6p to be connected to connection terminals 14p of a relay substrate 14 connected to signal terminals and power source terminals of the HDD 10. The number of the connection terminals 6p is the same as the number of the HDDs 10 that can be carried. The other surface of the connection substrate 6 is provided with a plurality of connection terminals for connection of connection terminals of the control device 4 and connection terminals of the power source device 5, although not illustrated.

In order to reduce the thickness of the electronic device housing device 1, it is desirable to make the housing 2 and the connection substrate 6 as thin as possible. This makes it difficult to secure a space for forming a through hole serving as a gas passage in the center portion of the connection substrate. This also makes it difficult to form a clearance between the upper and lower wall surfaces of the housing and the connection substrate. Thus, it is difficult to secure a gas passage that linearly guides a gas across the connection substrate.

Thus, a ventilation port 20 is provided utilizing a vacant space at least one of the left end portion and the right end portion of the connection substrate 6, in the embodiment a portion of the connection substrate 6 facing a space 3k. The ventilation port 20 is provided at the right end portion of the connection substrate 6, and the ventilation port 20 gathers a gas from the front housing portion 2f to guide the gas to the rear housing portion 2g.

Little clearance is provided between the connection substrate 6 and the upper and lower wall surfaces 2c and 2d of the housing 2 to reduce the thickness of the electronic device housing device 1. Reducing the thickness of the connection substrate 6 can further reduce the thickness of the electronic device housing device 1.

The flow of a gas guided into the housing is obstructed by the connection substrate 6. Therefore, a gas passage for guiding a gas is provided to extend in a direction along a surface of the connection substrate 6, in other words, in a direction across the slots. The gas passage will be discussed later.

A box 7 is provided in the space 3k at one end of the front housing portion 2f to house an interface card such as for USB. An interface terminal 7i is provided as exposed on an outer wall surface 7f of the box 7.

The cooling fans 8 rotate a plurality of blades to suck a gas into the housing. The gas sucked into the housing serves as cooling air to cool the HDDs 10, the control device 4, and the power source device 5. The gas utilized for cooling is discharged from exhaust panels 8e provided to the cooling fans 8 and having a plurality of through holes 8h. Thus, the exhaust panels 8e function as an exhaust port.

In the embodiment, no exterior panel is provided on the rear surface of the housing 2, and therefore the exhaust panels 8e are exposed to the outside. In the case where an exterior panel having through holes is provided on the rear surface of the housing 2, the gas is discharged from the inside of the housing to the outside via the through holes of the exterior panel. Examples of the gas include cooling media such as ammonia and carbon dioxide and nitrogen gases, in addition to air.

In the embodiment, as illustrated in FIG. 1B, two cooling fans 8 are provided near a rear wall 5b of the power source device 5, and disposed such that the outside surfaces of the exhaust panels 8e are flush with the outside surface of the rear wall 5b. The positions and the number of the cooling fans 8 may be selected as appropriate in accordance with the cooling performance.

The HDD 10 is a storage device that magnetically stores data using a rotatable magnetic disk medium and a magnetic head. Mechanical parts such as the magnetic disk medium and the magnetic disk are housed in a sealed case.

A carrier 11 is a holding member for carrying the HDD 10, and is removably insertable into each of the slots 3a to 3j provided in the front housing portion 2f. The carrier 11 is provided with a front panel 13 provided with a plurality of through holes 13h. The plurality of through holes 13h function as gas suction ports to take a gas into the housing.

In the embodiment, no exterior panel is provided on the front surface of the housing 2, and thus the front panel 13 of the carrier 11 is exposed to the outside. In the case where an exterior panel having through holes is provided on the front surface of the housing 2, the gas is taken from the outside via the exterior panel.

Then, the suction force of the cooling fans 8 causes the gas to flow in from the front panel 13 through the gas inlet port of the carrier 11 to be guided to the ventilation port 20 at the right end portion of the connection substrate 6 while circulating around the HDD 10 on the carrier 11.

Figure 2:
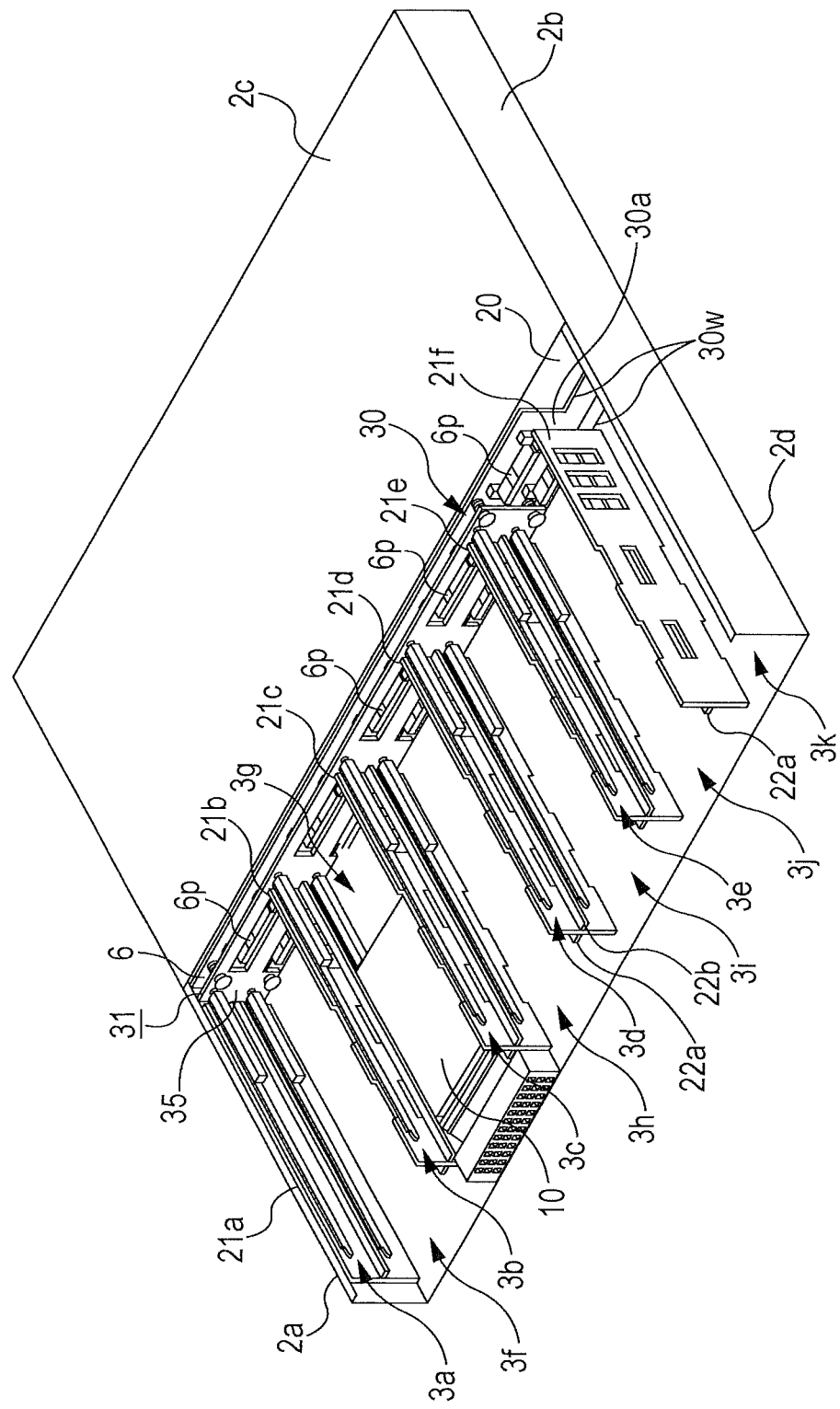
FIG. 2 is a view (part 1) illustrating the internal structure, of the electronic device housing device.

FIG. 2 is a view (part 1) illustrating the internal structure of the electronic apparatus. In order to illustrate the structure of each of the slots 3a to 3j, FIG. 2 illustrates a state in which the carrier 11 has been removed from slots other than the slot 3g. The box 7 discussed earlier is disposed in the space 3k at the right end portion, in FIG. 2, of the front housing portion 2f.

The slots 3a to 3e are slots in the upper row, and the slots 3f to 3j are slots in the lower row. The slots are partitioned by partition plates 21a to 21f, and defined between the partition plates 21a to 21f.

The partition plates 21a to 21f are disposed at equal intervals, and provided to extend upright perpendicularly to the lower wall surface 2d of the housing 2. Each of the partition plates 21a to 21f is provided with shelf plates 22a and 22b so that the carrier 11 is held by the shelf plates 22a and 22b. No partition plate is provided between the upper and lower slots.

A back panel 35 of an opening amount control device 31 is provided in a clearance 30w formed by the connection substrate 6 and the partition plates 21a to 21f to extend upright perpendicularly to the lower wall surface 2d of the housing 2. Therefore, a gap 30 is formed between the connection substrate 6 and the back panel 35.

The suction force of the cooling fans 8 causes the gas flowing into the gap 30 to flow along the connection substrate 6 to be guided to the ventilation port 20 at the right end portion of the connection substrate 6. Thus, the gap 30 is also utilized as a gas passage.

In order to control the gas flow rate, as illustrated in FIG. 2, the back panel 35 is designed to have such a length as to face the slots 3a to 3d and 3f to 3i. That is, the back panel 35 does not face the slots 3e and 3j. The gas guided from each of the slots 3a to 3j passes through a ventilation port 30a formed between the partition plate 21f at the right end portion in FIG. 2 and the connection substrate 6 to be guided to the ventilation port 20.

Figure 3:
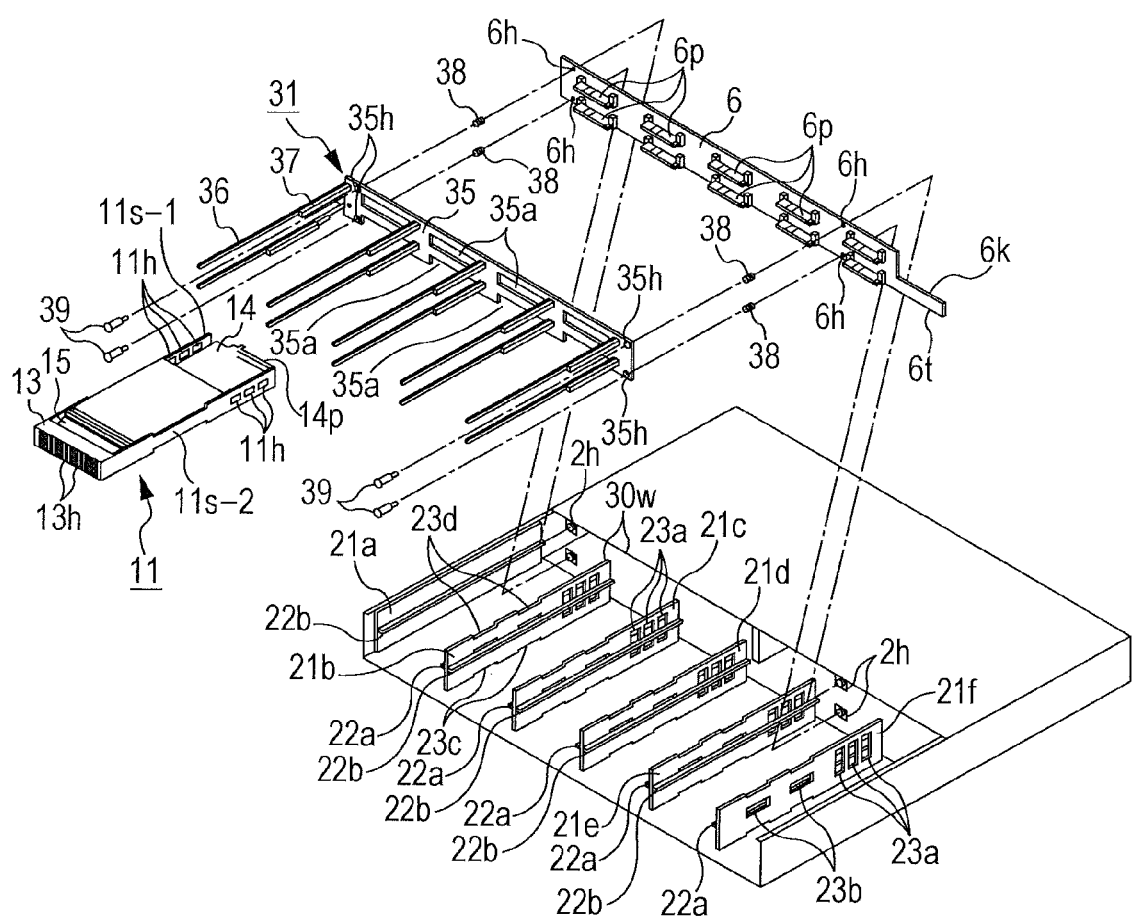
FIG. 3 is a view (part 2) illustrating the internal structure of the electronic device housing device.

FIG. 3 is a view (part 2) illustrating the internal structure of the electronic apparatus. In order to illustrate in more detail the structure illustrated in FIG. 2, FIG. 3 illustrates a state in which the connection substrate 6, the opening amount control device 31, and the HDDs 10 have been removed.

In the connection substrate 6, ten connection terminals 6p, the number of which is the same as that of the slots, are disposed in an arrangement of two rows by five columns. In addition, a notch 6k is provided at a right end portion 6t, in FIG. 3, of the connection substrate 6. The notch 6k, that is, an opening surrounded by the end portion 6t and the right lateral wall 2b and the upper wall 2c of the housing 2, is utilized as the ventilation port 20.

A ventilation port leading to the rear housing portion 2g is provided on the left end side and/or the right end side of the connection substrate 6, and has a size corresponding to the amount of inflow of gas into the slots 3a to 3j. The ventilation port may be a through hole provided at the left or right end portion of the connection substrate 6.

Alternatively, an opening surrounded by the left or right end of the connection substrate 6 and the right lateral wall 2b and the upper and lower walls 2c and 2d of the housing 2, rather than the notch 6k or a through hole, may be used as the ventilation port. Two ventilation ports leading to the rear housing portion 2g may be provided on both the left and right sides of the connection substrate 6.

The opening amount control device 31 includes first opening amount adjustment members 36 and second opening amount adjustment members 37. The first opening amount adjustment members 36 and the second opening amount adjustment members 37 are held by the back panel 35 serving as a holding member, and disposed to extend perpendicularly to a surface of the back panel 35.

The back panel 35 is provided with through holes 35a arranged in two rows by four columns. The through holes 35a are utilized for connection of the connection terminals 6p and the connection terminals 14p. The through holes 35a are formed to be larger in size than the connection terminals. The through holes 35a also serve as a gas passage.

The clearance 30w is formed in a portion of the housing 2 where the partition plates 21a to 21f and the connection substrate 6 are installed. The back panel 35 is disposed in the clearance 30w. Four screw holes 35h are provided at upper and lower left and right locations of the back panel 35. Four screw holes 6h are provided at upper and lower left and right locations of the connection substrate 6 to face the screw holes 35h.

Coil springs 38 are disposed between the back panel 35 and the connection substrate 6. Four bolts 39 penetrate through the screw holes 35h, center holes of the coil springs 38, and the screw holes 6h to be fastened to screw holes 2h of the housing 2 so that the opening amount control device 31 is fixed to the housing 2 to be horizontally movable in the front-rear direction of the device.

The carrier 11 is a holding member that can carry the HDD 10. The carrier 11 is provided with an open and close panel 15 to adjust the amount of inflow of gas. Left and right lateral walls 11s-1 and 11s-2 of the carrier are each provided with a plurality of through holes 11h.

No wall is provided at the rear portion of the carrier 11, and the connection terminal 14p of the relay substrate 14 of the HDD 10 is disposed to project to the outside. Thus, the connection terminal 14p can be connected to the connection terminal 6p via the through hole 35a.

The partition plates 21b to 21f are each provided with through holes 23a to 23d. The through holes 11h and the through holes 23a to 23d serve as a gas passage for guiding the gas flowing into each of the slots 3a to 3j in a direction across each of the partition plates 21b to 21f.

As illustrated in FIG. 3, the partition plate 21a at the left end in FIG. 3 is in close contact with the lateral wall surface 2a, and therefore is not provided with through holes. The through holes 23c and 23d are holes surrounded by the edges of notched portions formed by notching the partition plate in a horizontally long shape and the upper and lower wall surfaces 2c and 2d, respectively.

Figure 4:
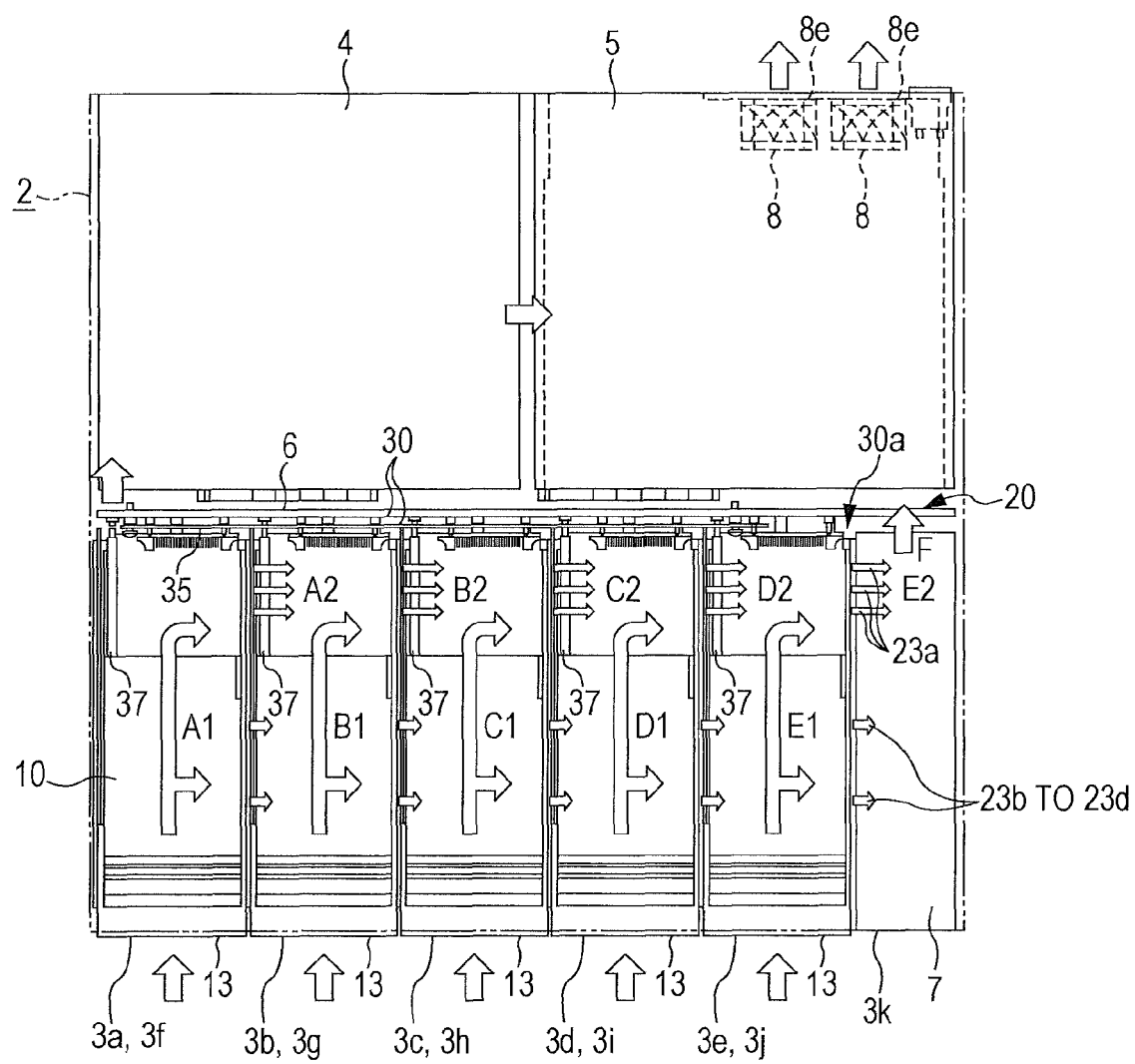
FIG. 4 is a view illustrating a gas flow from gas suction ports to an exhaust port.

FIG. 4 is a view illustrating a gas flow from the gas suction ports to the exhaust port. The carrier 11 is inserted into each of the slots 3a to 3j. FIG. 4 illustrates a state in which the HDD 10 is carried on each of the carriers 11.

When the cooling fans 8 are rotated, a gas is sucked into each of the slots 3a to 3j from the front panel 13 of the carrier 11 inserted into each of the slots 3a to 3j. As illustrated in FIG. 4, the gas flowing into the slots 3a and 3f at the left end in FIG. 4 flows as indicated by an arrow A1 to cool the HDD 10 in the carrier 11.

Then, the gas is oriented into a direction across the partition plate 21b and passes through the plurality of through holes 11h of the carrier 11 and the plurality of through holes 23a to 23d to be guided to the adjacent slots 3b and 3g as indicated by an arrow A2.

Likewise, the gas flowing into the slots 3b and 3g flows as indicated by an arrow B1 to cool the HDD 10 in the carrier 11. Then, the gas is oriented into a direction across the partition plate 21c and passes through the plurality of through holes 11h of the carrier 11 and the plurality of through holes 23a to 23d to be guided to the adjacent slots 3c and 3h as indicated by an arrow B2.

The gas flowing into the slots 3c and 3h flows as indicated by an arrow C1 to cool the HDD 10 in the carrier 11. Then, the gas is oriented into a direction across the partition plate 21d and passes through the plurality of through holes 11h of the carrier 11 and the plurality of through holes 23a to 23d to be guided to the adjacent slots 3d and 3i as indicated by an arrow C2.

The gas flowing into the slots 3d and 3j flows as indicated by an arrow D1 to cool the HDD 10 in the carrier 11. Then, the gas is oriented into a direction across the partition plate 21e and passes through the plurality of through holes 11h of the carrier 11 and the plurality of through holes 23a to 23d to be guided to the adjacent slots 3e and 3j as indicated by an arrow D2.

The gas flowing into the slots 3e and 3j flows as indicated by an arrow E1 to cool the HDD 10 in the carrier 11. Then, the gas is oriented into a direction across the partition plate 21f and passes through the plurality of through holes 11h of the carrier 11 and the plurality of through holes 23a to 23d to be guided to the adjacent slot 3k as indicated by an arrow E2.

The gas flowing as indicated by the arrow E1 to be guided to the ventilation port 30a and the gas guided to the ventilation port 30a through the gap 30 are also guided to the adjacent space 3k. Then, the gas is guided to the ventilation port 20 that communicates with the rear housing portion 2g.

The gas flows from the ventilation port 20 into the rear housing portion 2g as indicated by an arrow F, and is guided to the cooling fans 8 while cooling the control device 4 and the power source device 5 to be discharged from the exhaust panels 8e. Thus, the gas taken from the gas inlet ports can be guided in a direction across each of the partition plates to flow into the ventilation port 20.

In the electronic device housing device 1, as described above, the ventilation port 20 is provided at least one of the left end and the right end of the connection substrate, and a gas is gathered in a direction across each of the partition plates to be guided to the ventilation port 20.

Thus, the electronic device housing device 1 secures a gas passage from the gas inlet ports to the rear housing portion 2g. Hence, the size of the connection substrate and the state of parts mounted may be determined without consideration of securing a gas passage, and the size of the connection substrate is reduced, thereby further reducing the thickness of the device.

Figure 5:
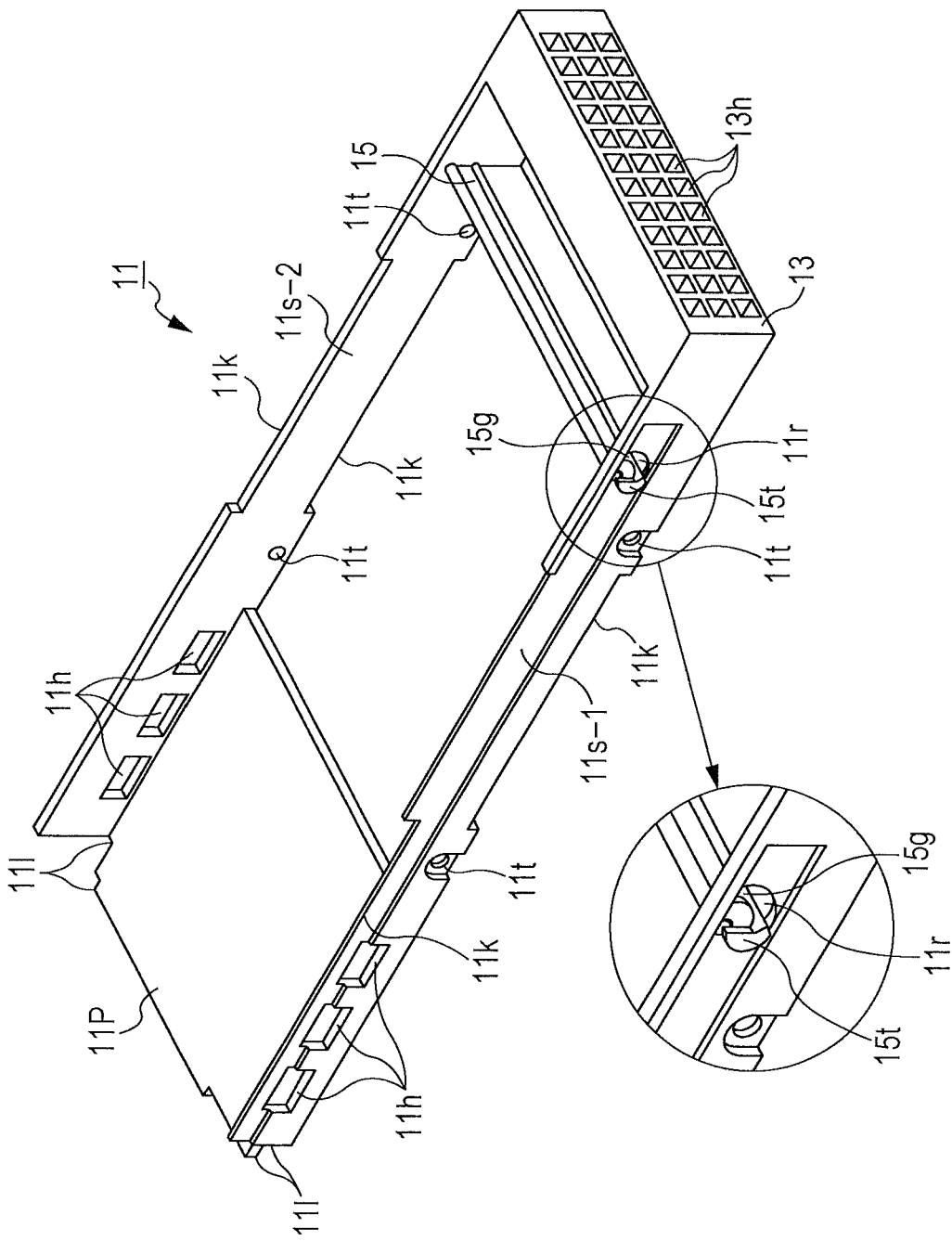
FIG. 5 is a perspective view illustrating the structure of a carrier.

FIG. 5 is a perspective view illustrating the structure of the carrier. FIG. 5 illustrates the carrier 11 carrying no HDD. The front panel 13 is provided on the front side of the carrier 11. A stepped surface 11P is provided on the backside of the carrier 11 to allow the relay substrate 14 of the HDD 10 to be disposed with precision.

Four screw holes 11t are provided on the front side and the backside of the left and right lateral wall surfaces 11s-1 and 11s-2 of the carrier 11. The HDD 10 is fixed to the carrier 11 using screws (not illustrated) utilizing the screw holes 11t.

A total of six through holes 11h are provided on the backside of the left and right lateral wall surfaces 11s-1 and 11s-2 of the carrier 11. The positions of the through holes 11h are determined in advance such that the through holes 11h face the through holes 23a of the partition plates 21b to 21f when the carrier 11 is set to each of the slots 3a to 3j.

A total of four through holes 11k formed by horizontally long notches are provided at the lower end portion of the left lateral wall surface 11s-1, in FIG. 5, of the carrier 11 near the center, at the upper end portion of the left lateral wall surface 11s-1 on the back side, and at the upper and lower end portions of the right lateral wall surface 11s-2, in FIG. 5, of the carrier 11 near the center.

The positions of the through holes 11k are determined in advance such that the through holes 11k face the through holes 23b to 23d of the partition plates 21b to 21f when the carrier 11 is set to each of the slots 3a to 3j. No wall is provided at the rear portion of the carrier 11 opposite the front panel 13, and the left and right lateral wall surfaces 11s-1 and 11s-2 are formed to be shorter than the overall length of the carrier 11.

Thus, through holes 11l are formed utilizing clearances resulting from the differences in length. The through holes 11h, 11k, and 11l serve as a gas passage through which a gas flowing in from the through holes 13h of the front panel serving as the gas inlet port passes.

The carrier 11 has a width that is larger than that of the HDD 10. Therefore, clearances are formed between the left and right lateral wall surfaces of the housing of the HDD 10 carried on the carrier 11 and the left and right end surfaces of the relay substrate 14 and the left and right lateral wall surfaces 11s-1 and 11s-2 of the carrier 11. Thus, the through holes 11h and the through holes 11k are not obstructed to block the gas flow.

The open and close panel 15 is provided near the front panel 13 of the carrier 11. The open and close panel 15 is provided to adjust the amount of gas flowing into each of the slots 3a to 3j (each carrier 11), and attached to the left and right lateral wall surfaces 11s-1 and 11s-2 so as to be rotatable about a rotary shaft 15g.

Abutment portions 15t in a curved shape are provided at both end portions of the open and close panel 15, and fitted in circular holes 11r of the left and right lateral wall surfaces 11s-1 and 11s-2 to be rotatable about the rotary shaft 15g. Rotational motion of the abutment portions 15t causes the open and close panel 15 to rotate over a range of 0 to 90 degrees, which varies the amount of opening (size of opening) of the gas inlet port. The method of controlling the amount of opening will be discussed later.

Figure 6:
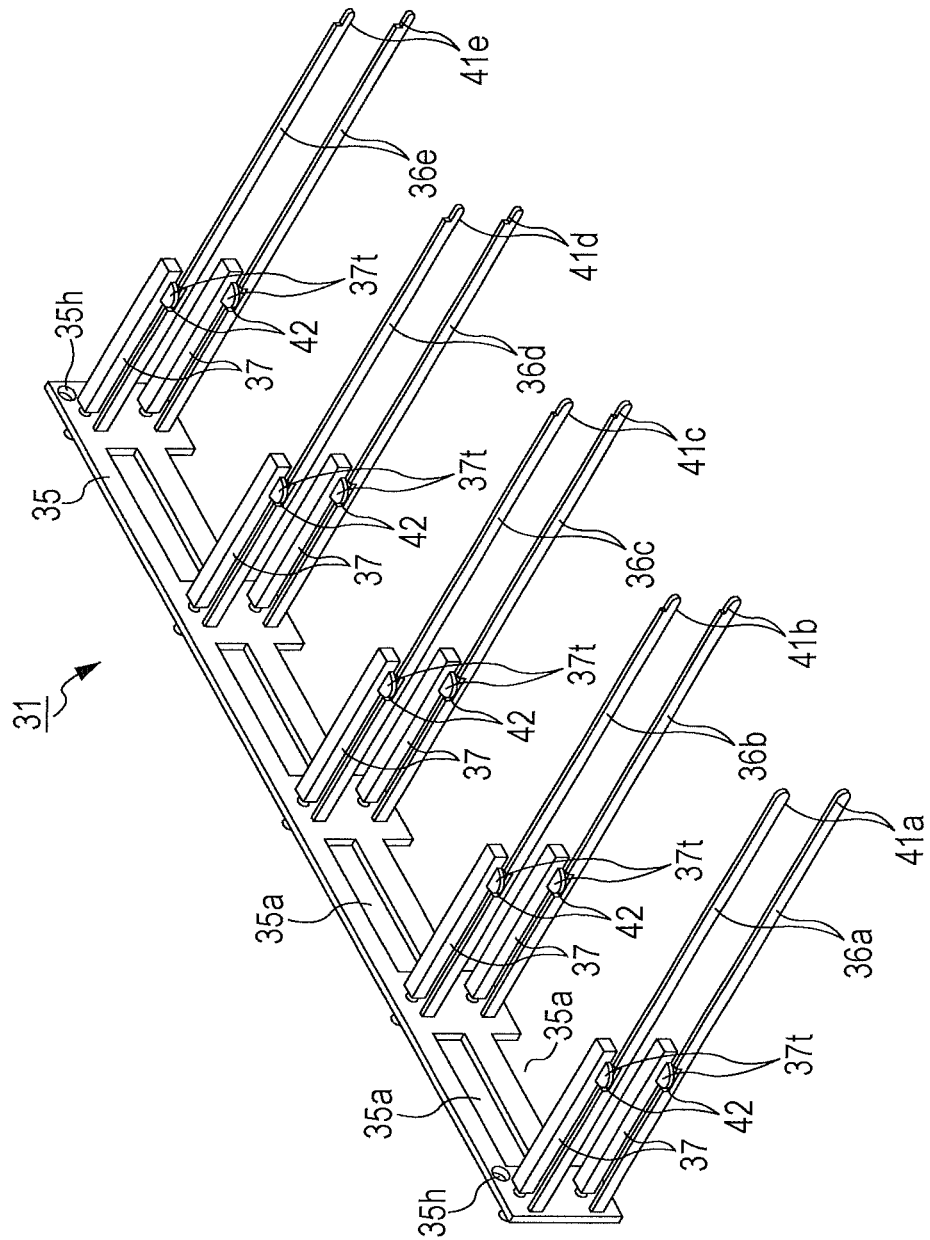
FIG. 6 is a perspective view illustrating an opening amount control device.

FIG. 6 is a perspective view illustrating the opening amount control device. The opening amount control device 31 includes the back panel 35, the first opening amount adjustment members 36a to 36e, and the second opening amount adjustment members 37. The ten first opening amount adjustment members 36a to 36e are disposed in the ten slots 3a to 3j, respectively.

First ends of the first opening amount adjustment members 36a to 36e are attached to the back panel 35. Second ends of the first opening amount adjustment members 36a to 36e are provided with angle defining portions 41a to 41e, respectively. In the embodiment, the angle defining portions 41a to 41e are formed integrally with the first opening amount adjustment members 36a to 36e, respectively, from a single metal plate. The first opening amount adjustment members disposed in vertically adjacent slots have the same configuration, and are denoted by the same reference symbol.

The ventilation port 20 leading to the rear housing portion 2g is provided at the left or right end portion, or along the left or right end, rather than at the center portion or along the upper or lower end, of the connection substrate 6. Therefore, the distances from the gas inlet ports for the slots 3a to 3j to the ventilation port 20 differ from each other. Hence, the amount and the pressure loss of the gas flowing into each of the slots 3a to 3j are varied in correspondence with the position of each of the slots 3a to 3j.

Thus, the amount of opening of the gas inlet port for each of the slots 3a to 3j is adjusted to make the amount of inflow of gas uniform to make the cooling performance uniform. Making the cooling performance uniform can optimize the rotational speeds of the cooling fans to reduce power consumption.

Thus, the amount of opening of the gas inlet port for each of the slots 3a to 3j is determined in advance in accordance with the amount of inflow of gas into each of the slots 3a to 3j. Specifically, the angle defining portions 41a to 41e opens and closes the open and close panel 15, and adjusts the amount of opening of the open and close panel 15. The angle defining portions 41a to 41e engage with the abutment portions 15t of the carrier 11 inserted into each of the slots 3a to 3j to define the rotational angle of the open and close panel 15.

The shapes of the angle defining portions 41a to 41e (the distal ends of the first opening amount adjustment members) are the same for vertically adjacent slots, but different for horizontally adjacent slots. The amount of opening of the gas inlet ports can be varied in accordance with the shapes of the angle defining portions 41a to 41e.

The angle defining portions 41a are formed in a curved stepless shape. The angle defining portions 41b to 41e are provided with an engagement step, which becomes gradually greater toward the ventilation port 20. The angle defining portions 41a which are the farthest from the ventilation port 20 are provided with no step, and the angle defining portions 41e which are the closest to the ventilation port 20 are provided with the greatest step.

Such differences in shape can vary the amount of opening of the gas inlet ports. The shape of each of the angle defining portions may be determined in accordance with the amount of inflow of gas into each of the gas inlet ports in the case where the ventilation port 20 is provided on the left end side of the connection substrate 6 or both on the left and right sides of the connection substrate 6.

The second opening amount adjustment members 37 are provided to bring the open and close panel 15 into an open state in the case where the HDD 10 is carried on the carrier 11 and into a closed state in the case where no HDD 10 is carried on the carrier 11.

Lock portions (engaging portions) 37t are provided at the distal ends of the second opening amount adjustment members 37 to engage with lock holes (engaged portions) 42 provided in the first opening amount adjustment members 36. The second opening amount adjustment members 37 will be discussed in detail later.

Figure 7A:
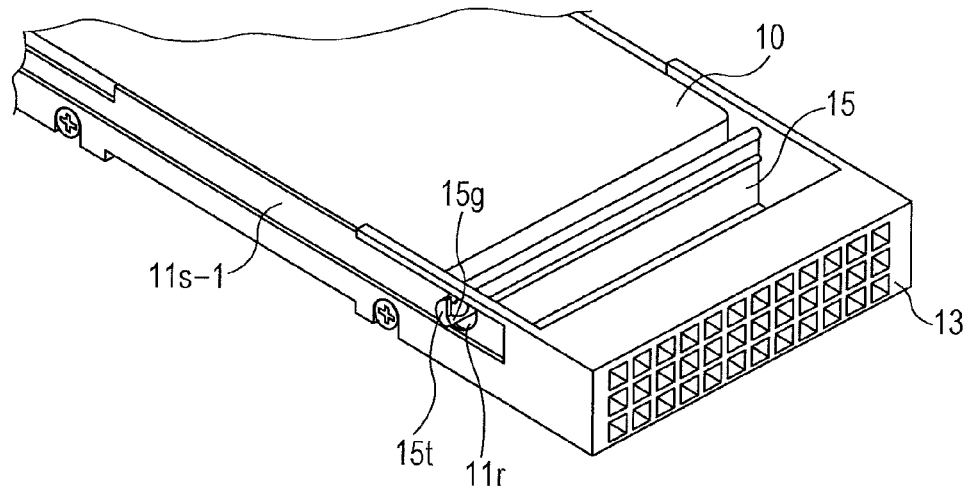
FIGS. 7A to 7C are each a view (part 1) illustrating the open state of an open and close panel.
Figure 7B:
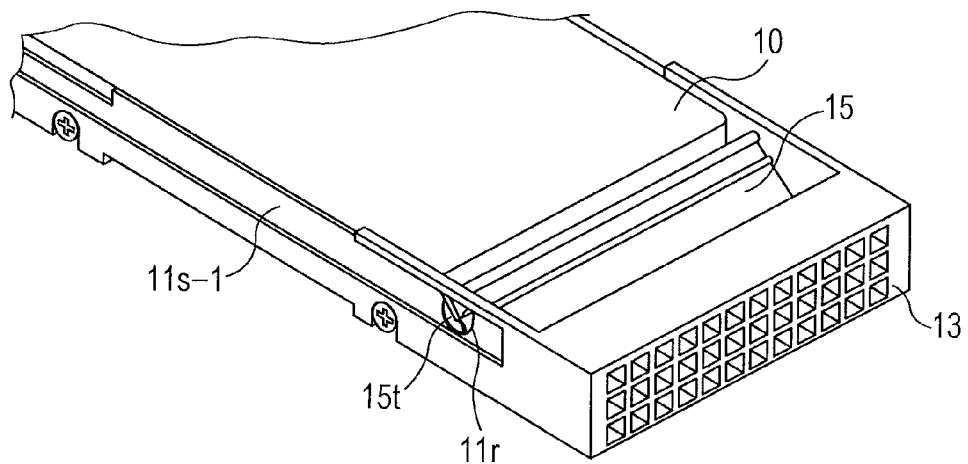
Figure 7C:
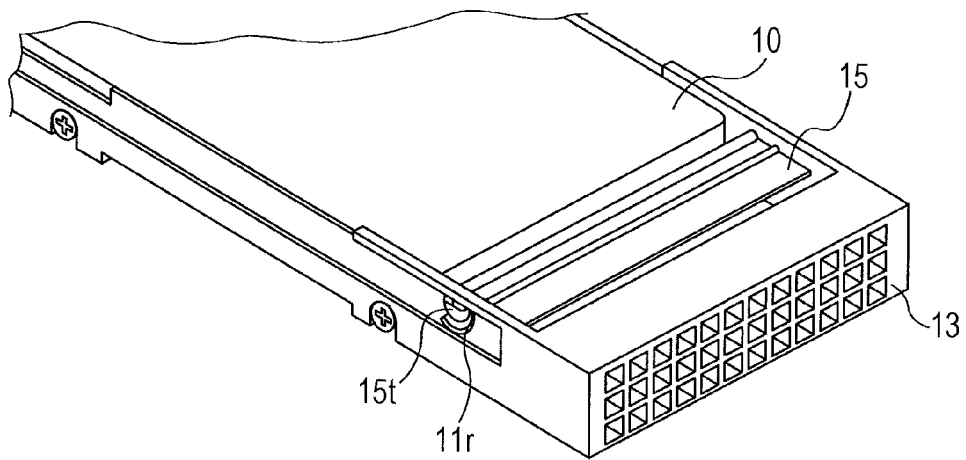

FIGS. 7A to 7C are each a view (part 1) illustrating the open state of the open and close panel. FIGS. 7A to 7C each illustrate a state in which no HDD 10 is carried on the carrier 11.

FIG. 7A illustrates a state before the carrier 11 is inserted into the slot. The open and close panel 15 is in the closed state at a position of 0 degrees because of its own weight. FIGS. 7B and 7C illustrate a state in which the carrier 11 is set in the slot. FIG. 7B illustrates the open and close panel 15 in a half-open state, and FIG. 7C illustrates the open and close panel 15 in a fully open state. The first opening amount adjustment members 36 etc. are not illustrated in FIGS. 7B and 7C in order that the positions of the abutment portions 15t can be seen easily.

When the carrier 11 is inserted into the slot, the abutment portion 15t projecting from the hole 11r is pushed by the distal end of the angle defining portion (not illustrated) to be rotated. When setting of the carrier 11 is completed, the abutment portion 15t is stopped at an angular position defined by the angle-defining portion. This brings the open and close panel 15 into an open state with a predetermined amount of opening.

Figure 8A:
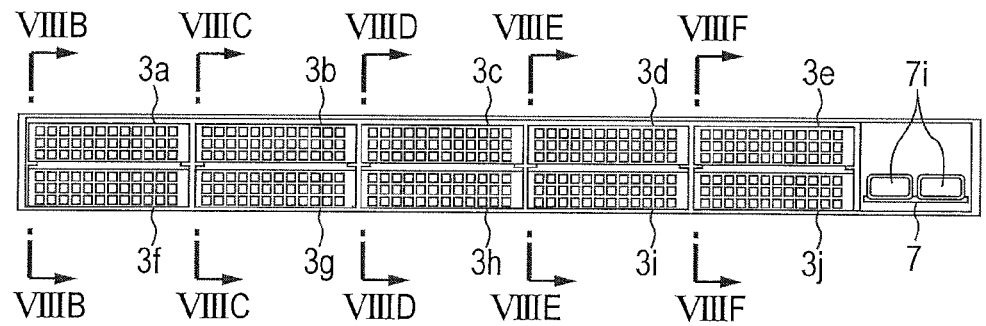
FIGS. 8A to 8F are each a view illustrating the open state of the open and close panels in each slot.

FIGS. 8A to 8F are each a view illustrating the open state of the open and close panel in each slot. FIG. 8A illustrates the electronic device housing device 1 as seen from the front side, illustrating a state in which the carrier 11 carrying the HDD 10 is inserted into each of the slots 3a to 3j.

In the case where a gas inlet port 15h is fully open, the rate of opening is 100%. The rate of opening becomes lower as the gas inlet port 15h is obstructed by the open and close panel 15 little by little. In the case where the open and close panel 15 is in the closed state, the rate of opening is 0%.

Figure 8B:
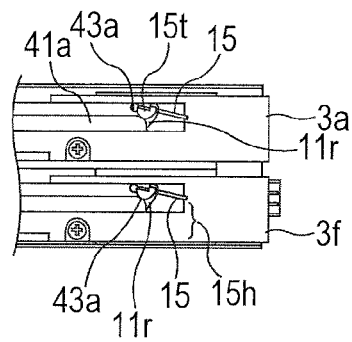

FIG. 8B is a cross-sectional view taken along the line VIIIB-VIIIB of FIG. 8A, illustrating a state of the open and close panel 15 and the abutment portion 15t in the slots 3a and 3f. With the abutment portion 15t pushed by a curved engagement portion 43a of the angle defining portion 41a to be turned upward, the open and close panel 15 is maintained at a position at which the rate of opening of the gas inlet port 15h is about 90%.

Figure 8E:
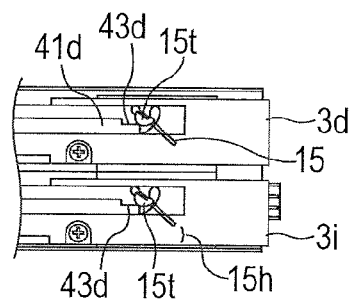
Figure 8C:
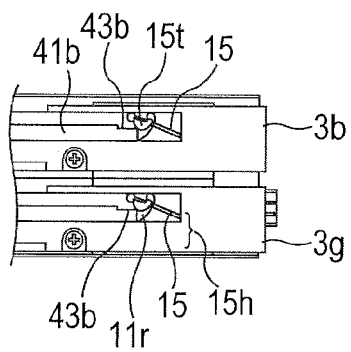

FIG. 8C is a cross-sectional view taken along the line VIIIC-VIIIC of FIG. 8A, illustrating a state of the open and close panel 15 and the abutment portion 15t in the slots 3b and 3g. With the abutment portion 15t pushed by an engagement step 43b of the angle defining portion 41b to be turned upward, the open and close panel 15 is held at a position at which the rate of opening of the gas inlet port 15h is about 80%.

Figure 8F:
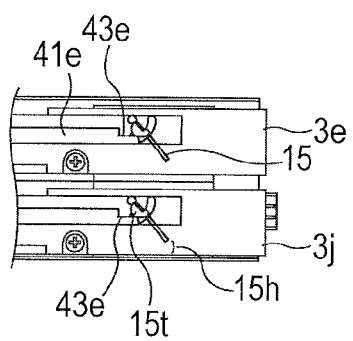
Figure 8D:
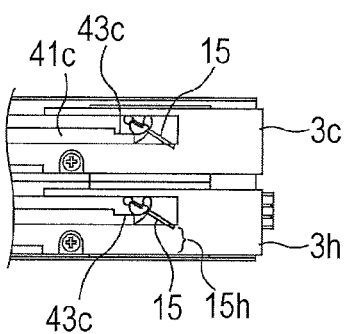

FIG. 8D is a cross-sectional view taken along the line VIIID-VIIID of FIG. 8A, illustrating a state of the open and close panel 15 and the abutment portion 15t in the slots 3c and 3h. With the abutment portion 15t pushed by an engagement step 43c of the angle defining portion 41c to be turned upward, the open and close panel 15 is held at a position at which the rate of opening of the gas inlet port 15h is about 70%.

FIG. 8E is a cross-sectional view taken along the line VIIIE-VIIIE of FIG. 8A, illustrating a state of the open and close panel 15 and the abutment portion 15t in the slots 3d and 3i. With the abutment portion 15t pushed by an engagement step 43d of the angle defining portion 41d to be turned upward, the open and close panel 15 is held at a position at which the rate of opening of the gas inlet port 15h is about 60%.

FIG. 8F is a cross-sectional view taken along the line VIIIF-VIIIF of FIG. 8A, illustrating a state of the open and close panel 15 and the abutment portion 15t in the slots 3e and 3j. With the abutment portion 15t pushed by an engagement step 43e of the angle defining portion 41e to be turned upward, the open and close panel 15 is held at a position at which the rate of opening of the gas inlet port 15h is about 45%.

As illustrated in FIGS. 8B to 8F, the engagement portions 43a have no step, and the engagement steps 43b to 43e have a step, which becomes gradually lower in height. The rate of opening of the gas inlet port 15h can be varied utilizing the differences in height among the steps.

The amount of opening (size of opening) of the gas inlet port 15h can likewise be varied by varying the lengths of the angle defining portions, rather than the differences in height among the steps, to vary the amount by which the abutment portion 15t is pushed. In this way, the opening amount control device 31 can control the amount of opening of the gas inlet port for each of the slots 3a to 3j to make the amount of inflow of gas into each of the slots 3a to 3j uniform.

The foregoing description is made for a case where the HDDs are carried on the carriers 11 for all of the slots 3a to 3j. In the case where a carrier carrying no HDD is inserted into a slot, inflow of gas into that slot is preferably suppressed in order to keep the balance among the amounts of inflow of gas into the other slots. Thus, in the case where a carrier carrying no HDD is inserted into a slot, the open and close panel 15 is brought into the closed state.

Figure 9A:
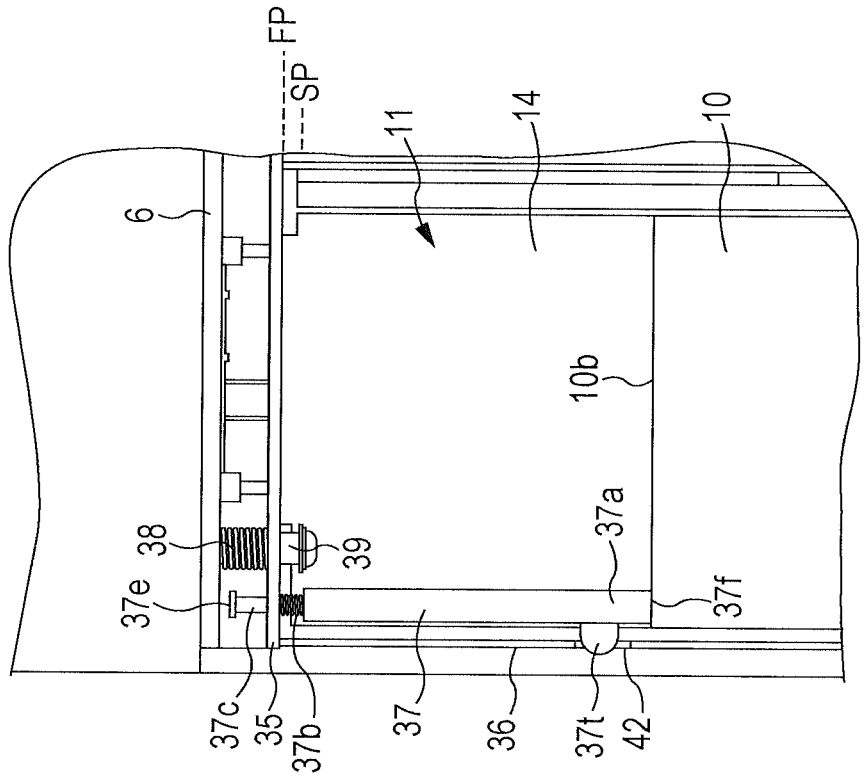
FIGS. 9A and 9B are each a view illustrating the state of engagement between the opening amount control device and an HDD.
Figure 9B:
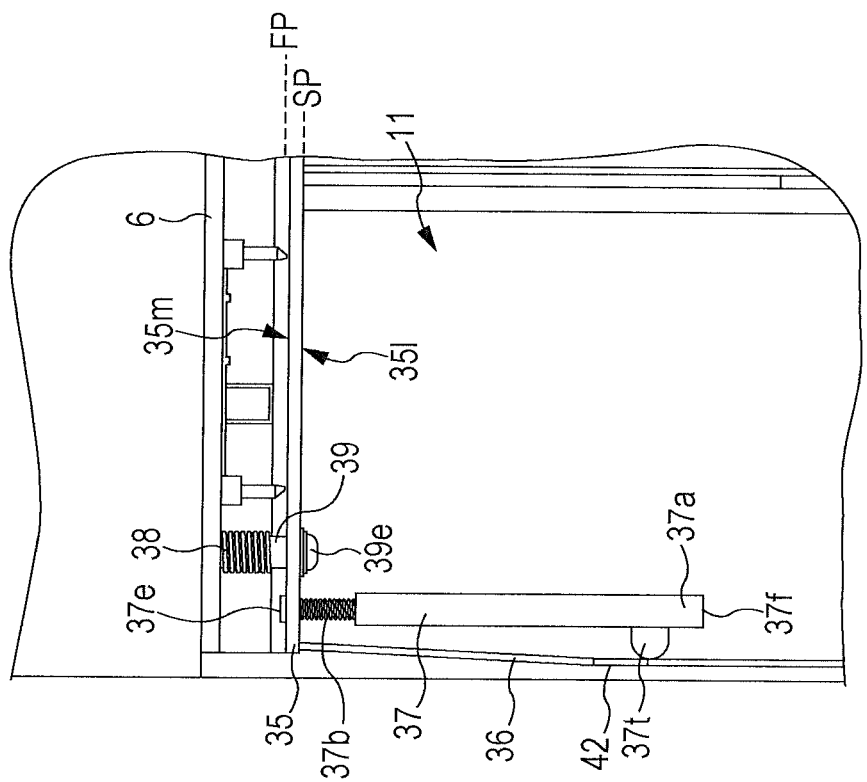

FIGS. 9A and 9B are each a view illustrating the state of engagement between the opening amount control device and the HDD. FIG. 9A illustrates a state with the carrier 11 carrying no HDD 10 is inserted into the slot. FIG. 9B illustrates a state with the carrier 11 carrying the HDD 10 is inserted into the slot.

As illustrated in FIG. 9A, the carrier 11 carries no HDD 10, and therefore a coil spring 37b of the second opening amount adjustment member 37 is expanded. The lock portion (engaging portion) 37*t* and the lock hole (engaged portion) 42 provided in the first opening amount adjustment member 36 are disengaged from each other. Therefore, the first opening amount adjustment member 36 is pushed leftward in FIG. 9A by the lock portion 37*t*.

The angle defining portion at the distal end portion of the first opening amount adjustment member 36 is moved away from the abutment portion 15*t* of the open and close panel 15. Therefore, the open and close panel 15 is not rotated but maintained in the closed state by its own weight. Thus, in the case where the carrier 11 carrying no HDD 10 is inserted into the slot, the open and close panel 15 can be brought into the closed state.

As illustrated in FIG. 9B, when the carrier 11 is inserted into the slot, a rear portion 10*b* of the HDD 10 carried on the carrier 11 contacts a distal end portion 37*f* of the second opening amount adjustment member 37. The second opening amount adjustment member 37 is pressed to contract the coil spring 37*b* of the second opening amount adjustment member 37 to move the lock portion 37*t*. Further, when the lock portion 37*t* is moved to face the lock hole 42, the lock portion 37*t* and the lock hole 42 are fitted with each other.

When the lock portion 37*t* and the lock hole 42 are fitted with each other, the first opening amount adjustment member 36 becomes straight, and the angle defining portion at the distal end portion of the first opening amount adjustment member 36 engages with the abutment portion 15*t* of the open and close panel 15. Thus, in the case where the carrier 11 carrying the HDD 10 is inserted into the slot, the open and close panel 15 can be brought into the open state with the abutment portion 15*t* of the open and close panel 15 pushed by the angle defining portion as discussed earlier.

In addition, the opening amount control device 31 can adjust the amount of opening of the gas inlet port 15*h* for each of the slots 3*a* to 3*j* in accordance with the number of the HDDs mounted in the electronic device housing device 1. The coil spring 38 is disposed between the back panel 35 and the connection substrate 6, and the bolt 39 is inserted into the center hole of the coil spring 38. The back panel 35 receives the pressing force of the HDD 10 and the elastic forces of the coil spring 37*b* and the coil spring 38 to be moved horizontally in the front-rear direction of the electronic device housing device 1.

In the case where no HDD 10 is carried on the carrier 11, as illustrated in FIG. 9A, a front surface 35*l* of the back panel 35 is pressed by the coil spring 37*b* of the second opening amount adjustment member 37 so that a rear surface 35*m* of the back panel 35 contacts a head 37*e* of a shaft portion 37*c*. In this state, the front surface 35*l* of the back panel 35 contacts a head 39*e* of the bolt 39. The coil spring 38 is expanded.

In this way, the back panel 35 is positioned at an initial position. FIG. 9A illustrates a case where none of the ten carriers 11 carries the HDD 10. The position of the back panel 35 in this case is set as an initial position SP.

When the carrier 11 carrying the HDD 10 is inserted into the slot, as illustrated in FIG. 9B, the second opening amount adjustment member 37 is pressed as discussed earlier so that the coil spring 37*b* presses the back panel 35. Then, the back panel 35 moves toward the rear of the electronic apparatus.

The electronic device housing device 1 includes the plurality of slots 3*a* to 3*j*. Therefore, the HDD 10 likewise presses the second opening amount adjustment member 37 in each of the slots 3*a* to 3*j* to press the back panel 35. Thus, the back panel 35 receives a pressing force (moving force) obtained by summing the pressing forces of one or a plurality of HDDs 10 to be moved toward the rear of the electronic apparatus.

The number of the HDDs and the magnitude of the moving force are proportional to each other. Thus, the amount of movement of the back panel 35 can be controlled in accordance with the number of the HDDs. Along with movement of the back panel 35, the first opening amount adjustment members 36 held by the back panel 35 are moved toward the rear of the electronic apparatus with respect to the abutment portions 15*t* of the open and close panels 15. That is, the angle defining portions are moved horizontally with respect to the abutment portions 15*t* of the open and close panels 15.

A portion of the abutment portion 15*t* that contacts the angle defining portion of the first opening amount adjustment member 36 is formed in an arcuate shape. Therefore, relative movement of the angle-defining portion with respect to the abutment portion 15*t* varies the position of engagement.

That is, the amount by which the angle-defining portion pushes the abutment portion 15*t* is varied to adjust the amount of opening of the gas inlet port 15*h*. FIG. 9B illustrates a case where all the ten carriers 11 carry the HDD 10. The position of the back panel 35 in this case is set as a final position FP.

Figure 10A:
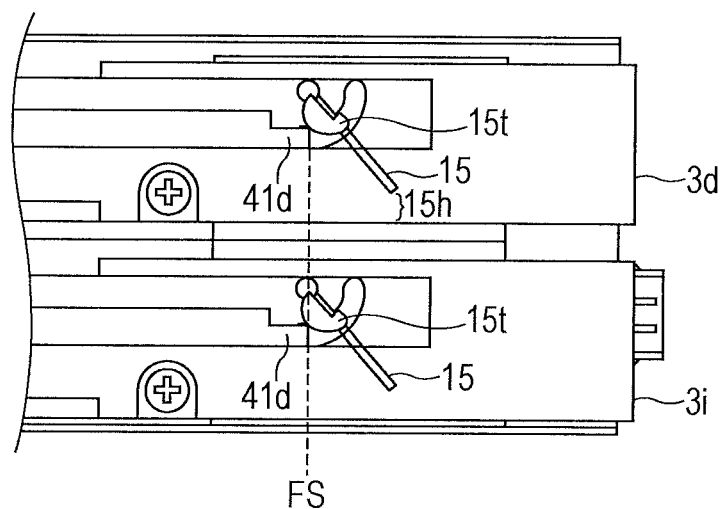
FIGS. 10A and 10B are each a view (part 2) illustrating the open state of the open and close panel.
Figure 10B:
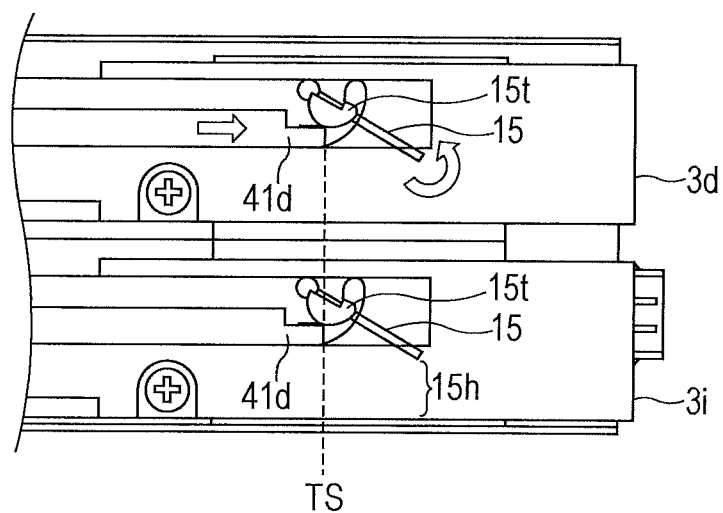

FIGS. 10A and 10B are each a view (part 2) illustrating the open state of the open and close panel. FIGS. 10A and 10B each illustrate a cross section taken along the line VIIIE-VIIIE illustrated in FIG. 8A. FIG. 10A illustrates a case where ten HDDs 10, the number of which is the same as that of the slots, are mounted in the electronic device housing device 1. That is, FIG. 10A illustrates a state in which the back panel 35 is positioned at the final position FP.

FIG. 10B illustrates a case where one to nine, that is, less than ten, HDDs 10 are mounted in the electronic device housing device 1. A position TS of the distal end of the angle defining portion 41*d* illustrated in FIG. 10B is closer to the front of the electronic apparatus than a position FS (final position) of the distal end of the angle defining portion 41*d* illustrated in FIG. 10A.

One to nine HDDs 10 are mounted in the electronic device housing device 1. Therefore, the back panel 35 receives the pressing forces of the HDDs 10, the coil springs 37*b*, and the elastic forces of the coil springs 38 as discussed earlier so that the back panel 35 is held between the initial position SP and the final position FP.

In the case where the number of the HDDs 10 is zero, the back panel 35 receives the elastic forces of the coil springs 37*b* so that the back panel 35 is held at the initial position SP. That is, the back panel 35 is moved toward the front of the electronic apparatus in accordance with the number of the HDDs 10 decreases, and the back panel 35 is at the initial position SP in the case where the number of the HDDs 10 is zero.

The distal end of the angle-defining portion is likewise moved toward the front of the electronic apparatus in accordance with the number of the HDDs 10 decreases. In the case where the number of the HDDs 10 is one to nine, that is, less than that of the slots (ten), the distal end of the angle-defining portion 41*d* is positioned in front of the electronic apparatus.

That is, as the number of the HDDs 10 is reduced, the abutment portion 15*t* is gradually moved toward the front of the electronic apparatus by the engagement step 43*d* of the angle-defining portion 41*d*. In addition, the open and close panel 15 is rotated by a larger angle so that the amount of opening of the gas inlet port 15*h* becomes larger than the amount of opening illustrated in FIG. 8E.

As the number of the HDDs 10 is increased, conversely, the abutment portion 15*t* is gradually moved toward the rear of the electronic apparatus by the engagement step 43*d* of the angle-defining portion 41*d*. In addition, the open and close panel 15 is rotated by a smaller angle so that the amount of opening of the gas inlet port 15h becomes closer to the amount of opening illustrated in FIG. 8E. In the case where the HDD 10 is carried on the carrier 11 for all the slots 3a to 3j, the amount of opening of the gas inlet port 15h for the slots 3d and 3i is as illustrated in FIG. 8E.

Thus, the amount of opening of the gas inlet port 15h illustrated in FIG. 10B can be made larger than the amount of opening illustrated in FIG. 10A. Also for the open and close panels 15 of the carriers 11 inserted into other slots, the position of engagement between the angle-defining portion and the abutment portion 15t is likewise varied to vary the amount by which the angle-defining portion pushes the abutment portion 15t. Therefore, the amount of opening of the gas inlet port 15h can be varied. The open and close panel 15 for the carrier 11 carrying no HDD 10 is not moved but remains in the closed state.

In the case where the HDD 10 is carried on the all the carriers 11, the amount of opening of the gas inlet port 15h for all the slots 3a to 3j is as illustrated in FIGS. 8B to 8F. As the number of the HDDs 10 is reduced, in contrast, the amount of opening of the gas inlet port 15h for all the slots 3a to 3j becomes larger than that illustrated in FIGS. 8B to 8F. As the number of the HDDs 10 is increased, conversely, the amount of opening of the gas inlet port 15h for all the slots 3a to 3j becomes closer to that illustrated in FIGS. 8B to 8F.

According to the electronic device housing device 1 of the embodiment, as has been described above, the opening amount control device 31 can be used to control the amount of opening of the gas inlet port 15h of the carrier 11 inserted into each of the slots 3a to 3j in accordance with the number of the HDDs 10 mounted.

Thus, it is possible to make the amount of inflow of gas into each of the slots 3a to 3j uniform, which allows to efficiently air-cooling electronic devices. Hence, the rotational speeds of the cooling fans 8 can be optimized to reduce power consumption.

In order to use the cooling fans 8 more efficiently, the rotational speeds of the cooling fans 8 may be varied in accordance with the number of the HDDs 10 mounted. In this case, a position sensor that detects the position of the back panel 35 may be provided to the housing 2 so that a fan control circuit of the control device 4 can control the rotational speeds of the cooling fans 8 in accordance with the detected position.

The present disclosure is not limited to the embodiment described above. A plurality of embodiments may be combined with each other as far as no contradiction occurs. The embodiment described above is merely exemplary, and any embodiment that has a configuration substantially identical to the technical idea described in the claims of the present disclosure and that achieves the same function and effect falls within the technical scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic device housing device comprising:
a housing;
a plurality of slots that are arranged side by side inside the housing, the slots each housing an electronic device;
a gas passage that guides a gas flowing into each of the slots in a direction across the slots;
a connection substrate provided inside the housing to extend upright, the connection substrate being arranged to face the slots, the connection substrate including a connected portion to which a connecting portion of the electronic device housed in each of the slots is to be connected;
a ventilation port provided at an end portion of the connection substrate, the ventilation port allowing the gas to flow into through the gas passage from each of the slots; and
a fan that sucks the gas flowing into each of the slots into the ventilation port through the gas passage; and
a carrier that carries the electronic device, the carrier being removably insertable into each of the slots to be housed in each of the slots, the carrier having a through hole provided at a position of each of side walls which serves as the gas passage,
wherein the housing includes an opening amount control device that controls an amount of opening of a gas inlet port for the carrier,
wherein the carrier each includes an open and close panel provided to be rotatable about a rotary shaft of the open and close panel, the gas inlet port is an opening formed by opening and closing of the open and close panel, and the opening amount control device includes a first opening amount adjustment member that engages with the open and close panel and that rotates the open and close panel by a preset rotational angle to adjust the amount of opening of the gas inlet port, and
wherein the first opening amount adjustment member includes an angle defining portion with a distal end having a shape corresponding to the rotation angle of the open and close panel, and the angle defining portion is shaped differently in accordance with a position of each of the slots.

2. The electronic device housing device according to claim 1, wherein the opening amount control device further includes a second opening amount-adjustment member that moves the angle defining portion to engage with an abutment portion of the open and close panel to bring the open and close panel into an open state, the second opening amount-adjustment member moving the angle defining portion away from the abutment portion of the open and close panel to bring the open and close panel into a closed state.

3. The electronic device housing device according to claim 2, wherein the second opening amount adjustment member includes an engaging portion, the first opening amount adjustment member includes an engaged portion provided in a surface facing the second opening amount adjustment member, and the engaging portion is engaged with the engaged portion when the carrier carrying the electronic device is housed in one of the slots and the second opening amount adjustment member is pressed to move by the housed carrier.

4. The electronic device housing device according to claim 1, wherein the opening amount control device controls the amount of opening of the gas inlet port for the carrier so as to vary a position of engagement between the angle defining portion and the abutment portion of the open and close panel by moving the first opening amount adjustment member using a pressing force generated when the carrier carrying the electronic device is housed in one of the slots.

5. The electronic device housing device according to claim 4, wherein the electronic device mounted on the carrier presses the second opening amount adjustment member to move the first opening amount adjustment member.

6. The electronic device housing device according to claim 2, wherein the opening amount control device further includes
- a holding member that mounts the first opening amount adjustment member and the second opening amount adjustment member, the first opening amount adjustment member and the second opening amount adjustment member being provided in correspondence with a position at which the carrier is housed, and
- an elastic member that applies an elastic force to move the holding member in a horizontal direction.

7. The electronic device housing device according to claim 6, wherein the holding member is moved upon receiving a pressing force generated when the carrier carrying the electronic device is housed in one of the slots, and the first opening amount adjustment member is moved to vary a position of engagement between the angle defining portion and the abutment portion of the open and close panel.

8. The electronic device housing device according to claim 7, wherein the electronic device mounted on the carrier presses the second opening amount adjustment member to press the holding member to move the first opening amount adjustment member.

* * * * *

UNITED STATES PATENT AND TRADEMARK OFFICE
CERTIFICATE OF CORRECTION

PATENT NO. : 8,824,137 B2
APPLICATION NO. : 13/451658
DATED : September 2, 2014
INVENTOR(S) : Takaya Nakayama Page 1 of 1

It is certified that error appears in the above-identified patent and that said Letters Patent is hereby corrected as shown below:

In the claims

Column 14, line 14, in claim 1, delete "and".

Signed and Sealed this
Eighteenth Day of November, 2014

Michelle K. Lee
*Deputy Director of the United States Patent and Trademark Office*